(12) United States Patent
Raveh et al.

(10) Patent No.: US 11,756,312 B2
(45) Date of Patent: Sep. 12, 2023

(54) ORIENTATION-AGNOSTIC LANE TRACKING IN A VEHICLE

(71) Applicant: GM Global Technology Operations LLC, Detroit, MI (US)

(72) Inventors: Alon Raveh, Jerusalem (IL); Shaul Oron, Rehovot (IL); Bat El Shlomo, Hod Hasharon (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 413 days.

(21) Appl. No.: 17/024,265

(22) Filed: Sep. 17, 2020

(65) Prior Publication Data

US 2022/0083791 A1 Mar. 17, 2022

(51) Int. Cl.
*G06V 20/58* (2022.01)
*G06V 20/56* (2022.01)
*G05D 1/02* (2020.01)
*G06F 18/21* (2023.01)
*G05D 1/00* (2006.01)

(52) U.S. Cl.
CPC ......... *G06V 20/588* (2022.01); *G05D 1/0212* (2013.01); *G06F 18/217* (2023.01); *G05D 1/0088* (2013.01); *G05D 2201/0213* (2013.01)

(58) Field of Classification Search
USPC ........................................................ 382/103
See application file for complete search history.

(56) References Cited

U.S. PATENT DOCUMENTS

| 8,996,197 B2* | 3/2015 | Joh ....................... B60W 30/12 701/1 |
| 11,613,272 B2* | 3/2023 | Raveh ................... B60W 40/06 701/26 |
| 2013/0141520 A1* | 6/2013 | Zhang ..................... G06T 7/215 348/149 |
| 2019/0113925 A1* | 4/2019 | Sim ....................... G05D 1/0214 |
| 2021/0233390 A1* | 7/2021 | Georgiou ................ G08G 1/04 |
| 2022/0083791 A1* | 3/2022 | Raveh .................. G06V 20/588 |

OTHER PUBLICATIONS

A Flexible Modeling Approach for Robust Multi-Lane Road Estimation Alexey Abramov, Christopher Bayer, Claudio Heller and Claudia Loy arXiv:1706.01631v1 [cs.RO] Jun. 6, 2017 (Year: 2017).*

(Continued)

*Primary Examiner* — Ishrat I Sherali
(74) *Attorney, Agent, or Firm* — CANTOR COLBURN LLP (57) ABSTRACT

Systems and methods include obtaining observation points of a lane line using a sensor of a vehicle. Each observation point indicates a location of a point on the lane line. A method includes generating or updating a lane model with the observation points. The lane model indicates a path of the lane line and the lane model is expressed in a lane-specific coordinate system that differs from a vehicle coordinate system that is defined by an orientation of the vehicle. The method also includes transforming the lane-specific coordinate system to maintain a correspondence between the lane-specific coordinate system and the vehicle coordinate system based on a change in orientation of the vehicle resulting in a change in the vehicle coordinate system.

20 Claims, 4 Drawing Sheets

(56) References Cited

OTHER PUBLICATIONS

Lane Geometry Estimation in Urban Environments Using a Stereovision System R. Danescu, S. Nedevschi, M.M. Meinecke, T.B. To Proceedings of the 2007 IEEE Intelligent Transportation Systems Conference Seattle, WA, USA, Sep. 30-Oct. 3, 2007 (Year: 2007).*
Lane Detection using Smoothing Spline Chaiwat Nuthong, Theekapun Charoenpong 2010 3rd International Congress on Image and Signal Processing (CISP2010) (Year: 2010).*

* cited by examiner

ORIENTATION-AGNOSTIC LANE TRACKING IN A VEHICLE

BACKGROUND OF THE INVENTION

The subject disclosure relates to orientation-agnostic lane tracking in a vehicle.

Vehicles (e.g., automobiles, trucks, construction equipment, farm equipment, automated factory equipment) increasingly employ sensors to obtain information about the vehicle and its environment. Semi-autonomous operation (e.g., lane departure correction, automated steering or braking) and autonomous operation of a vehicle may require the ability to navigate to a destination and to stay within lane lines, for example. Detecting and tracking all lane lines in a vehicle's vicinity facilitates identifying upcoming turns, avoiding on-coming traffic, and other operations. Accordingly, it is desirable to provide orientation-agnostic lane tracking in a vehicle.

SUMMARY

In one exemplary embodiment, a method includes obtaining observation points of a lane line using a sensor of a vehicle. Each observation point indicates a location of a point on the lane line. The method also includes generating or updating a lane model with the observation points. The lane model indicates a path of the lane line and the lane model is expressed in a lane-specific coordinate system that differs from a vehicle coordinate system that is defined by an orientation of the vehicle. The lane-specific coordinate system is transformed to maintain a correspondence between the lane-specific coordinate system and the vehicle coordinate system based on a change in orientation of the vehicle resulting in a change in the vehicle coordinate system.

In addition to one or more of the features described herein, the obtaining the observation points includes processing detections from one or more sensors.

In addition to one or more of the features described herein, the processing the detections from the one or more sensors includes performing image processing of images from a camera.

In addition to one or more of the features described herein, the method also includes determining whether the observation points pertain to an existing lane model, wherein the updating the lane model with the observation points refers to updating the existing lane model based on determining that the observation points pertain to the existing lane model.

In addition to one or more of the features described herein, the determining whether the observation points pertain to the existing lane model includes obtaining a distance between each of the observation points and a localized tangent of the existing lane model.

In addition to one or more of the features described herein, the determining whether the observation points pertain to the existing lane model is based on applying a threshold value to the distance between the observation points and the existing lane model.

In addition to one or more of the features described herein, the updating the existing lane model includes updating an existing recursive least squares (RLS) adaptive filter.

In addition to one or more of the features described herein, the generating the lane model with the observation points refers to initializing a new lane model based on determining that the observation points do not pertain to the existing lane model.

In addition to one or more of the features described herein, the generating the lane model includes determining the lane-specific coordinate system as a major axis and a minor axis of the observation points using principal component analysis.

In addition to one or more of the features described herein, the initializing the new lane model includes initializing a new recursive least squares (RLS) adaptive filter.

In another exemplary embodiment, a system includes one or more sensors of a vehicle to obtain observation points of a lane line. Each observation point indicates a location of a point on the lane line. The system also includes a controller to generate or update a lane model with the observation points. The lane model indicates a path of the lane line and the lane model is expressed in a lane-specific coordinate system that differs from a vehicle coordinate system that is defined by an orientation of the vehicle. The lane-specific coordinate system is transformed to maintain a correspondence between the lane-specific coordinate system and the vehicle coordinate system based on a change in orientation of the vehicle resulting in a change in the vehicle coordinate system.

In addition to one or more of the features described herein, the observation points result from processing detections of the one or more sensors.

In addition to one or more of the features described herein, the observation points result from performing image processing of images from a camera.

In addition to one or more of the features described herein, the controller determines whether the observation points pertain to an existing lane model and to update the existing lane model with the observation points based on determining that the observation points pertain to the existing lane model.

In addition to one or more of the features described herein, the controller determines whether the observation points pertain to the existing lane model by obtaining a distance between each of the observation points and a localized tangent of the existing lane model.

In addition to one or more of the features described herein, the controller determines whether the observation points pertain to the existing lane model by applying a threshold value to the distance between the observation points and the existing lane model.

In addition to one or more of the features described herein, the controller updates the existing lane model by updating an existing recursive least squares (RLS) adaptive filter.

In addition to one or more of the features described herein, the controller generates the lane model with the observation points by initializing a new lane model based on determining that the observation points do not pertain to the existing lane model.

In addition to one or more of the features described herein, the controller generates the lane model by determining the lane-specific coordinate system as a major axis and a minor axis of the observation points using principal component analysis.

In addition to one or more of the features described herein, the controller initializes the new lane model by initializing a new recursive least squares (RLS) adaptive filter.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

As previously noted, lane detection and tracking is necessary for many vehicle operations (e.g., navigating, avoiding collisions, maintaining traffic flow). Prior lane tracking systems used the orientation of the vehicle as the coordinate system within which to model all lanes. However, this approach proves less effective when, for example, a lane orientation is perpendicular to the vehicle orientation. Embodiments of the systems and methods detailed herein relate to orientation-agnostic lane tracking in a vehicle. A coordinate system is determined for each lane that is modeled from observation points detected for the lane, and a lane model is generated in that coordinate system. Yet, because the lane-specific coordinate system is referenced to the vehicle coordinate system, the lane model can be adjusted as the vehicle moves.

Figure 1:
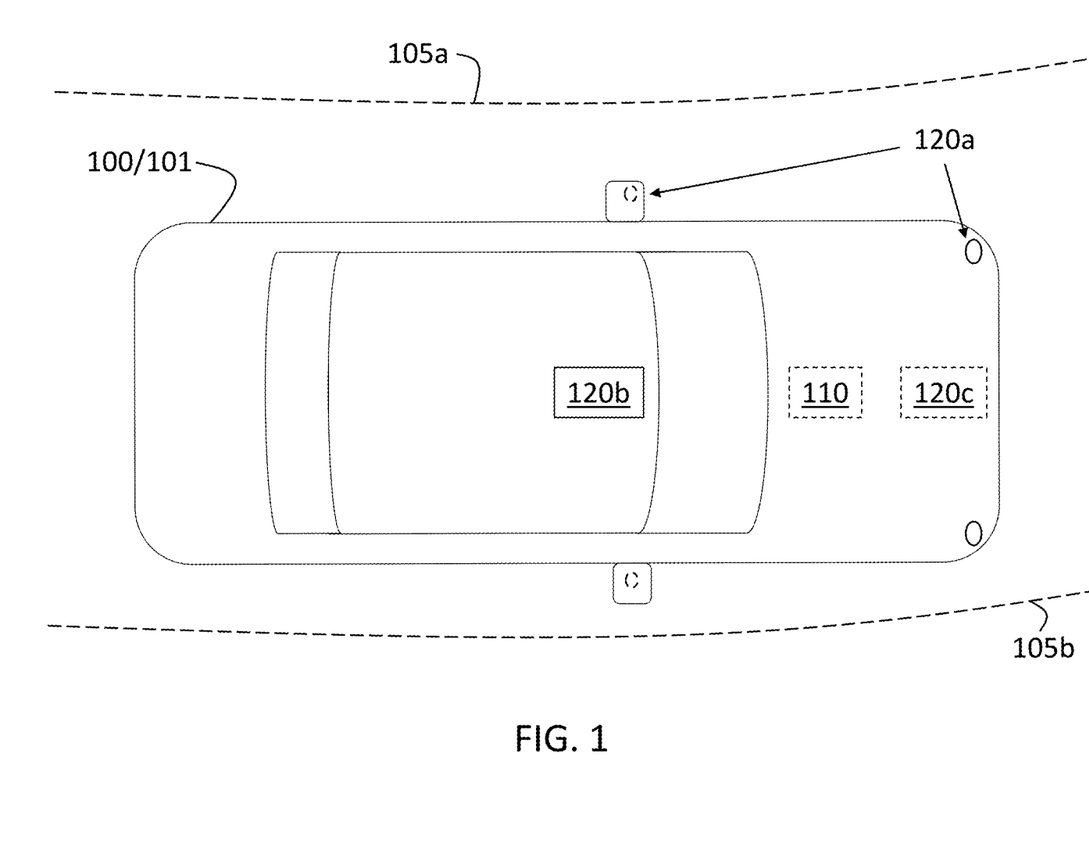
FIG. 1 is a block diagram of a vehicle that includes orientation-agnostic lane tracking according to one or more embodiments.

In accordance with an exemplary embodiment, FIG. 1 is a block diagram of a vehicle 100 that includes orientation-agnostic lane tracking. The exemplary vehicle 100 in FIG. 1 is an automobile 101. The vehicle 100 is shown within two lane lines 105a, 105b (generally 105). In order to perform semi-autonomous or autonomous control of the vehicle 100, the lane lines 105 in the vicinity of the vehicle 100 are modeled in accordance with one or more embodiments detailed herein. For example, the lane models 310 (FIG. 4) may prevent undertaking an autonomous maneuver that steers the vehicle 100 outside lane lines 105 and into oncoming traffic. The vehicle 100 includes a controller 110 that performs orientation-agnostic lane tracking as further detailed with reference to FIG. 2. The controller 110 may additionally implement semi-autonomous or autonomous operation of the vehicle 100 based, in part, on the tracking. The controller 110 includes processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

To perform the lane tracking, the controller 110 obtains observation points 310 (FIG. 4) from one or more sensors 120. Exemplary sensors 120 shown in FIG. 1 include cameras 120a, a lidar system 120b, and a radar system 120c (generally referred to as 120). One or more cameras 120a, the lidar system 120b, or a combination may be used by the controller 110 to obtain observation points 310 of a given lane line 105. The exemplary types, numbers, and positions of the sensors 120 shown in FIG. 1 are not intended to limit alternate arrangements of sensors 120 of the vehicle 100 or the sensors 120 that are used to obtain the observations points 310 used for lane tracking. The processing involved in obtaining the observation points 310 from raw detections of the one or more sensors 120 is known and not further detailed herein. For example, image processing may be performed on one or more images obtained within a field of view of a camera 120a around the vehicle 100. The image processing may identify one or more lane lines 105 and associated observation points 310. A point cloud obtained using a lidar system 120b may similarly be processed to obtain observation points 310 of one or more lane lines 105.

Figure 2:
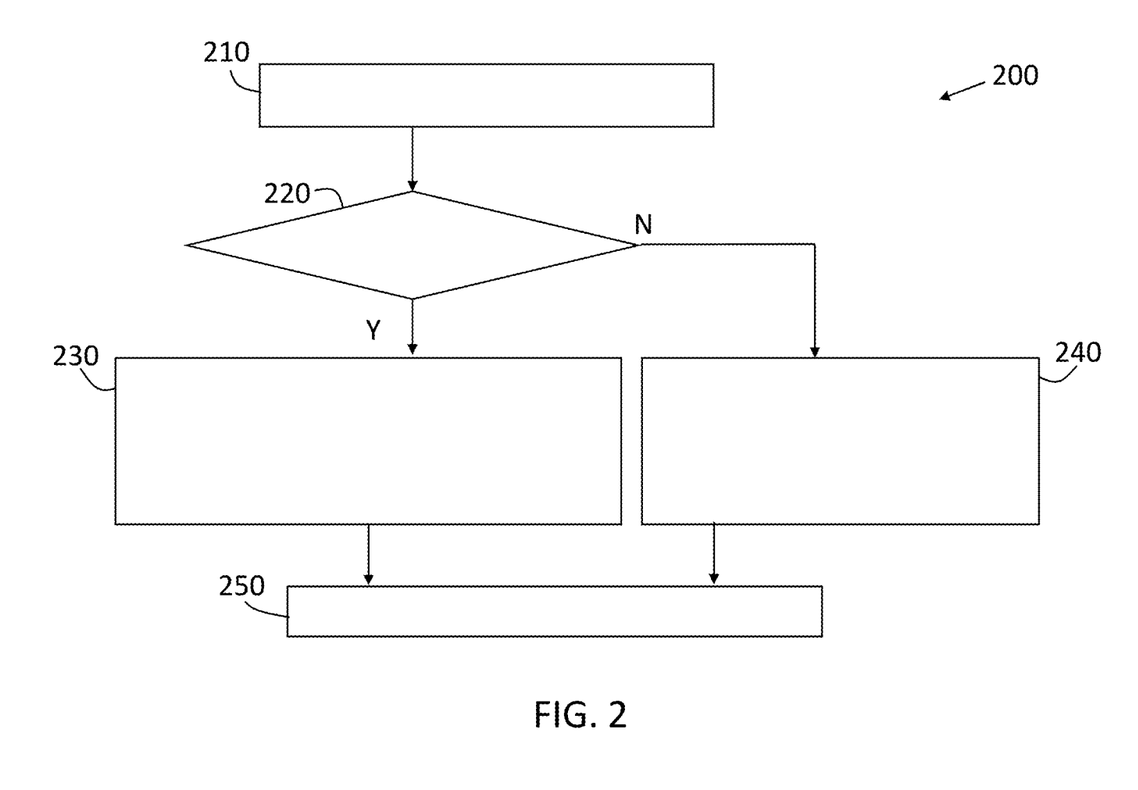
FIG. 2 is a process flow of a method of performing orientation-agnostic lane tracking according to one or more embodiments.

FIG. 2 is a process flow of a method 200 of performing orientation-agnostic lane tracking according to one or more embodiments. At block 210, obtaining observation points 310 (FIG. 4) includes processing detections from one or more sensors 120 to identify one or more points of a lane line 105. For example, image processing may be performed on an image of a portion a lane line 105 obtained using a camera 120a in order to obtain the observation points 310. The one or more sensors 120 may obtain observation points 310 periodically (e.g., every 100 milliseconds). Thus, the process flow shown in FIG. 2 may be performed iteratively based on each new set of observation points 310 obtained at block 210.

Figure 3:
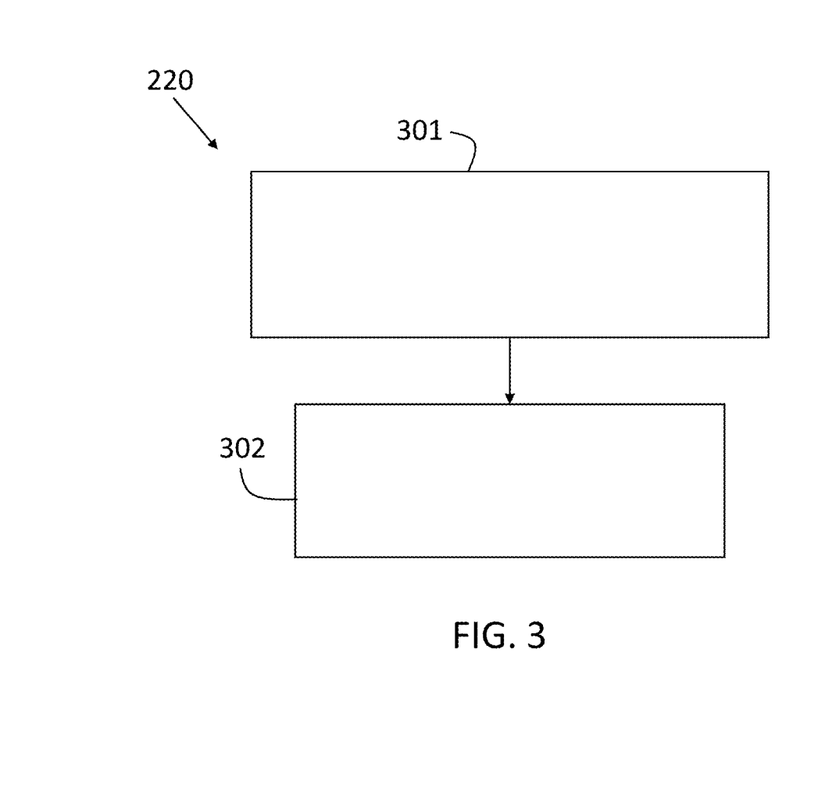
FIG. 3 is a process flow detailing the determination at block 220 of FIG. 2.
Figure 4:
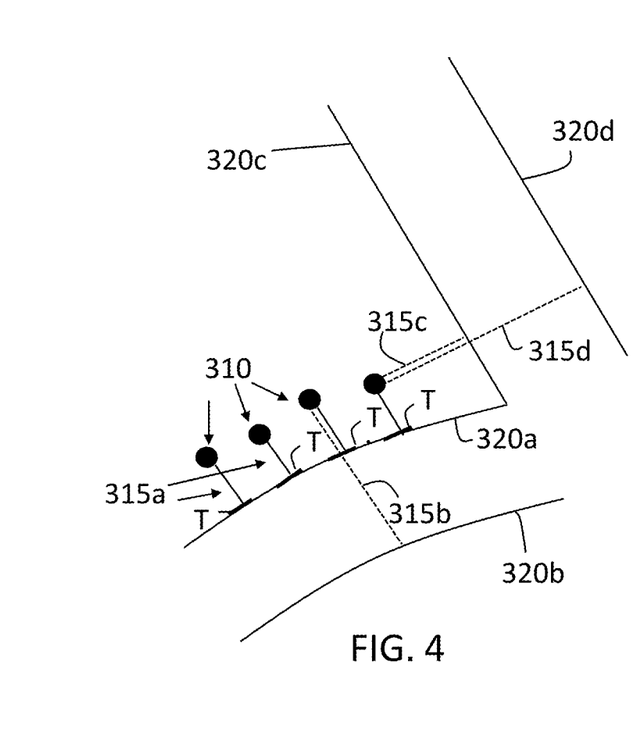
FIG. 4 illustrates aspects of the processes shown in FIG. 3.

At block 220, a process flow, detailed with reference to FIG. 3, is performed to determine if the observations points 310 obtained at block 210 are part of an existing lane model 320 (FIG. 4). If the observation points 310 are part of an existing lane model 320 (as determined at block 220), then updating the existing lane model 320 with the observation points 310 is performed at block 230. This updating may include updating a recursive least squares (RLS) adaptive filter, as noted with reference to FIG. 5. If the observation points 310 are not part of an existing lane model 320 (as determined at block 220), then, at block 240, the processes include initializing a new lane model 320 and determining a lane-specific coordinate system for the new lane model 320, as further discussed with reference to FIG. 5.

At block 250, transforming to match vehicle movement refers to adjusting all existing lane models 320 as the vehicle 100 moves in order to maintain the correspondence between the coordinate system of each lane model 320 and the coordinate system of the vehicle 100. The coordinate system (x, y) of the vehicle 100 is determined at a time t, with x representing the direction of travel and y being perpendicular to x. This is illustrated, for example, in FIG. 6. At a next interval t+Δt, the coordinate system (x', y') of the vehicle 100 is determined again to adjust for a change in orientation of the vehicle 100 at time t+Δt based on the movement of the vehicle 100 between time t and time t+Δt. This is indicated with the dashed outline in FIG. 6. Depending on the orientation and straightness of a given road, the coordinate systems at time t and at time t+Δt may be unchanged. The interval (zit) may be on the order of 100 milliseconds, for example. The process at block 250 includes obtaining samples from each lane model 320 (e.g., sample points 325 shown in FIG. 6) and performing a transform of the coordinate system that is specific to each lane model 320 based on the change of orientation of the vehicle 100. Each lane model 320 is then fitted to its transformed coordinate system.

According to an exemplary embodiment, the transform process, at block 250, includes determining a rotation, according to well-known techniques, between the coordinate system of each lane model 320 and the new coordinate system (x', y') of the vehicle 100. According to another exemplary embodiment, the transform process, at block 250, includes adjusting the previous transform (i.e., the transform of the coordinate system of each lane model 320 to match the previous coordinate system (x, y) of the vehicle 100) according to the adjustment of the coordinate system of the vehicle 100 from the previous coordinate system (x, y) to the new coordinate system (x', y'). That is, the same adjustment that is done to the existing coordinate system (x, y) of the vehicle 100 to obtain the new coordinate system (x', y') may be performed on the coordinate systems of the lane models 320.

FIG. 3 is a process flow detailing the determination at block 220. Specifically, the determination at block 220 is of whether the observation points 310 obtained at block 210 (FIG. 2) are associated with an existing lane model 320. FIG. 4 illustrates aspects of the processes shown in FIG. 3 and is referenced in the discussion of FIG. 3. FIG. 4 shows four exemplary lane models 320a, 320b, 320c, 320d (generally referred to as 320). Observation points 310 obtained with a camera 120a or other sensor 120 are also shown.

At block 301, the process of determining whether the observation points 310 (obtained at block 210) pertain to an existing lane model 320 includes determining a metric between the observation points 310 and each existing lane model 320. According to an exemplary embodiment, the metric is a distance 315 from each observation point 310 to a localized linear approximation of an existing lane model 320. The localized linear approximations associated with the four observation points 310 shown in FIG. 4 are indicated as localized tangents T in FIG. 4 for the lane model 320a. Determination of a localized tangent T is further discussed. A set of distances 315a is obtained. Each distance in the set of distances 315a is from one of the observation points 310 to the localized tangent line T for the lane model 320a. For all the other exemplary lane models 320b, 320c, 320d, a similar procedure may be followed to obtain sets of distances 315b, 315c, 315d (generally referred to as 315). Each set of distances 315 refers to four in the exemplary case, because four observation points 310 are shown. One distance 315 for each set (i.e., one distance 315b, one distance 315c, one distance 315d) is indicated in FIG. 4 for explanatory purposes.

As previously noted, the localized tangent T is computed for each observation point 310 when distance 315 is used as a metric according to an exemplary embodiment. For explanatory purposes, an observation point 310 (u, v) and a lane model 320 given by y=f(x) are considered. The tangent of f(x) at a point x=u is determined using f'(u)=df(x)/dx. Specifically, the tangent line T is of the form:

$$a^*x + b^*y + c = 0 \quad [\text{EQ. 1}]$$

As such, $$y = f'(u)^*x + (f(u) - f'(u)^*u) \quad [\text{EQ. 2}]$$

As a result, $$f(x) - y + (f(u) - f'(u)^*u) = 0 \quad [\text{EQ. 3}]$$

Referring to EQ. 1, a=f'(u), b=−1, and c=f(u)−f'(u)*u. Then the distance 315 between the observation point 310 (u, v) and the localized tangent point may be computed as the inner product <(a, b, c), (u, v, 1)>. The inner product calculation is a known and efficient process that may be parallelized to compute the distance 315 for a set of observation points 310 simultaneously.

Once a set of distances 315 is obtained for each existing lane model 320, a global optimization problem may be set up using distance as a maximal allowed single association cost according to one exemplary embodiment. The distance that is used as the maximal allowed single association cost may be an average distance of a given set of distances 315, a maximum distance among the given set of distances 315, or a median distance among the given set of distances 315 according to alternate embodiments. Assuming, for explanatory purposes, that the maximal allowed single association cost is an average distance, an average distance for the set of distances 315a and averages distances for all the other exemplary sets of distances 315b, 315c, 315d are obtained. A threshold average distance value may be used for gating (i.e., as a criterion for an invalid match). Then an algorithm such as the Hungarian algorithm may be used to obtain the optimal global solution. This solution to the global optimization problem will indicate one, if any, lane model 320 among the existing lane models 320 with which to associate the observation points 310.

Figure 5:
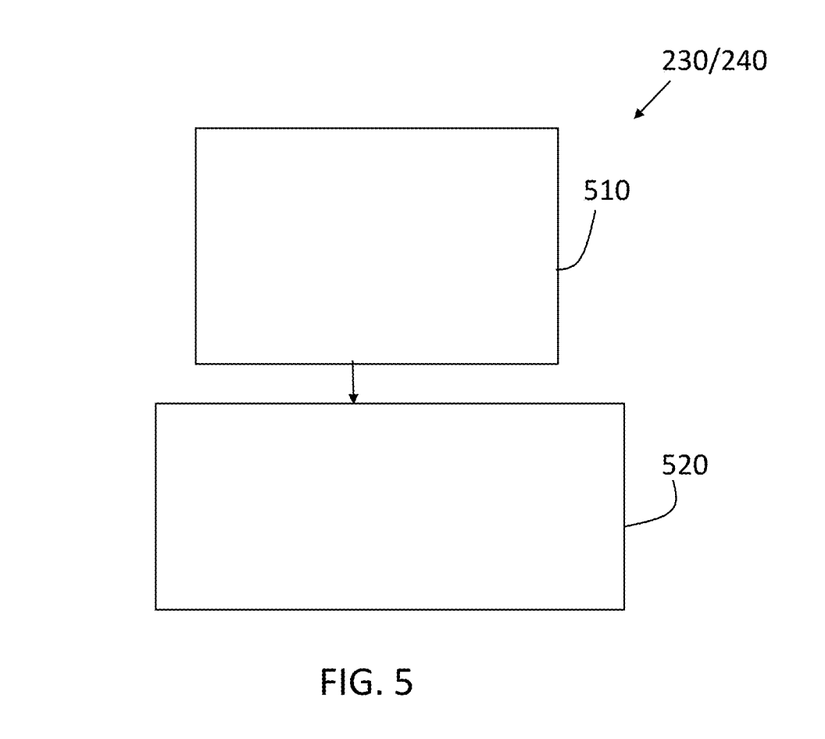
FIG. 5 is a process flow detailing determining a coordinate system and generating or updating a lane model based on the observation points at block 250 of FIG. 2.
Figure 6:
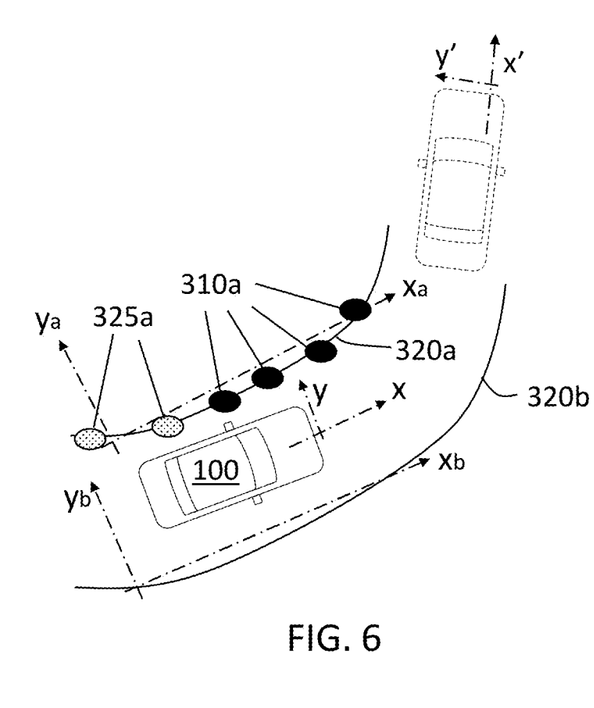
FIG. 6 illustrates aspects of the processes shown in FIG. 5.

FIG. 5 is a process flow detailing determining a lane-specific coordinate system and generating or updating a lane model 320, at blocks 230 or 240, based on the observation points 310 obtained at block 210. FIG. 6 illustrates aspects of the processes shown in FIG. 5 and is referenced in the discussion of FIG. 5. FIG. 6 shows a vehicle 100 with a corresponding coordinate system (x, y) at a first position and orientation and shows the vehicle 100 with a corresponding coordinate system (x', y') at a second position and orientation. The coordinate systems ($x_a$, $y_a$) and ($x_b$, $y_b$) shown for the two exemplary lane models 320a and 320b are determined according to the process at block 510. The lane model 320a is indicated with sample points 325a and associated observation points 310a and is assumed to have existed prior to obtaining the new observation points 310 in the exemplary case shown. Alternately, in lieu of an existing lane model 320a, a new lane model 320a may be generated according to the processes at block 230.

The process at block 510 is performed when a new lane model 320 is initialized at block 240. At block 510, determining a major axis and a minor axis of the observation points 310a may include using an available statistical procedure such as principal component analysis (PCA), for example. That is, according to an exemplary embodiment, the coordinates $x_a$ and $y_a$ are obtained as the major axis and minor axis for the observation points 310a using PCA, which uses an orthogonal transformation to convert the observation points 310 into a set of linearly uncorrelated variables called principal components. Performing PCA, which is a known statistical algorithm, may include using machine learning. PCA involves finding an orthogonal basis set such that the first linearly uncorrelated variable has the largest possible variance. In the exemplary application, the major axis of the coordinate system of the lane model 320 is to have the largest possible variance, so the PCA algorithm is tailored accordingly. The PCA formulation essentially performs eigen vector decomposition to the two-dimensional covariance matrix of the observation points 310 that make up the new lane model 320. The major axis is in the direction of the eigen vector that corresponds to the largest eigen value of the decomposition and the minor axis is in the direction orthogonal to the major axis.

The process at block 520 is performed for a new lane model 320 (initialized at block 230) or to update an existing lane model 320 (at block 240). If the observation points 310a obtained at block 210 are associated with an existing lane model 320a (i.e., the processing is at block 230), then the processes at block 520 include updating an existing RLS adaptive filter corresponding with the existing lane model 320a. If the observation points 310a obtained at block 210 are associated with a new lane model 320a (i.e., the processing is at block 240), then the processes at block 520 include initializing a new RLS adaptive filter corresponding with the new lane model 320. The RLS adaptive filter is well-known and only generally described herein.

Equations relevant to the RLS adaptive filter are:

$$P_k = (\lambda_k P_{k-1}^{-1} + H_k^T R_k^{-1} H_k)^{-1} \quad [\text{EQ. 4}]$$

$$K_k = P_k H_k^T R_k^{-1} \quad [\text{EQ. 5}]$$

$$\overline{\theta}_{k|k} = \overline{\theta}_{k|k-1} K_k (\overline{y}_k - H_k \overline{\theta}_{k|k-1}) \quad [\text{EQ. 6}]$$

Each observation point 310 is obtained as a location (x, y). $\overline{\theta}_k$ is the vector of coefficients of the lane model 320 at iteration (or time) k, and $P_k$ is the covariance matrix of $\overline{\theta}_k$. These values are updated with each set of observation points 310. $\lambda_k$ is a forgetting factor that gives exponentially less weight to older error samples. $H_k$ is a matrix that is a function of x and $R_k$ is an input noise matrix. Since $P_k$, $H_k$, and $R_k$ are known at EQ. 4, $K_k$, an update gaining matrix, may be solved according to EQ. 5 and used in EQ. 6 to determine the covariance matrix of $\overline{\theta}_k$.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method comprising:
    obtaining observation points of a lane line using a sensor of a vehicle, wherein each observation point indicates a location of a point on the lane line;
    generating or updating a lane model with the observation points, wherein the lane model indicates a path of the lane line and the lane model is expressed in a lane-specific coordinate system that differs from a vehicle coordinate system that is defined by an orientation of the vehicle, wherein the generating or the updating includes:
    determining a distance metric for each existing lane model of a plurality of existing lane models, the distance metric determined based on a set of distances including a distance from each observation point to an existing lane model, and selecting one of the plurality of existing lane models based on the distance metric and a single distance association cost; and
    transforming the lane-specific coordinate system of the selected lane model to maintain a correspondence between the lane-specific coordinate system and the vehicle coordinate system based on a change in orientation of the vehicle resulting in a change in the vehicle coordinate system.

2. The method according to claim 1, wherein the obtaining the observation points includes processing detections from one or more sensors.

3. The method according to claim 2, wherein the processing the detections from the one or more sensors includes performing image processing of images from a camera.

4. The method according to claim 1, wherein the updating the lane model with the observation points refers to updating the existing lane model based on determining that the observation points pertain to the existing lane model.

5. The method according to claim 4, wherein the determining whether the observation points pertain to the existing lane model includes obtaining a distance between each of the observation points and a localized tangent of the existing lane model.

6. The method according to claim 5, wherein the determining whether the observation points pertain to the existing lane model is based on applying a threshold value to the distance between the observation points and the existing lane model.

7. The method according to claim 4, wherein the updating the existing lane model includes updating an existing recursive least squares (RLS) adaptive filter.

8. The method according to claim 4, wherein the generating the lane model with the observation points refers to initializing a new lane model based on determining that the observation points do not pertain to the existing lane model.

9. The method according to claim 8, wherein the generating the lane model includes determining the lane-specific coordinate system as a major axis and a minor axis of the observation points using principal component analysis.

10. The method according to claim 8, wherein the initializing the new lane model includes initializing a new recursive least squares (RLS) adaptive filter.

11. A system comprising:
    one or more sensors of a vehicle configured to obtain observation points of a lane line, wherein each observation point indicates a location of a point on the lane line; and
    a controller configured to generate or update a lane model with the observation points, wherein the lane model indicates a path of the lane line and the lane model is expressed in a lane-specific coordinate system that differs from a vehicle coordinate system that is defined by an orientation of the vehicle, and to transform the lane-specific coordinate system of the selected lane model to maintain a correspondence between the lane-specific coordinate system and the vehicle coordinate system based on a change in orientation of the vehicle resulting in a change in the vehicle coordinate system, the controller configured to generate or update the model based on:
    determining a distance metric for each existing lane model of a plurality of existing lane models, the distance metric determined based on a set of distances including a distance from each observation point to an existing lane model, and selecting one of the plurality of existing lane models based on the distance metric and a single distance association cost.

12. The system according to claim 11, wherein the observation points result from processing detections of the one or more sensors.

13. The system according to claim 12, wherein the observation points result from performing image processing of images from a camera.

14. The system according to claim 11, wherein the controller is further configured to update the existing lane model with the observation points based on determining that the observation points pertain to the existing lane model.

15. The system according to claim 14, wherein the controller is configured to determine whether the observation points pertain to the existing lane model by obtaining a distance between each of the observation points and a localized tangent of the existing lane model.

16. The system according to claim 15, wherein the controller is configured to determine whether the observation points pertain to the existing lane model by applying a threshold value to the distance between the observation points and the existing lane model.

17. The system according to claim 14, wherein the controller is configured to update the existing lane model by updating an existing recursive least squares (RLS) adaptive filter.

18. The system according to claim 14, wherein the controller is configured to generate the lane model with the observation points by initializing a new lane model based on determining that the observation points do not pertain to the existing lane model.

19. The system according to claim 18, wherein the controller is configured to generate the lane model by determining the lane-specific coordinate system as a major axis and a minor axis of the observation points using principal component analysis.

20. The system according to claim 18, wherein the controller is configured to initialize the new lane model by initializing a new recursive least squares (RLS) adaptive filter.

* * * * *